Figure 1:
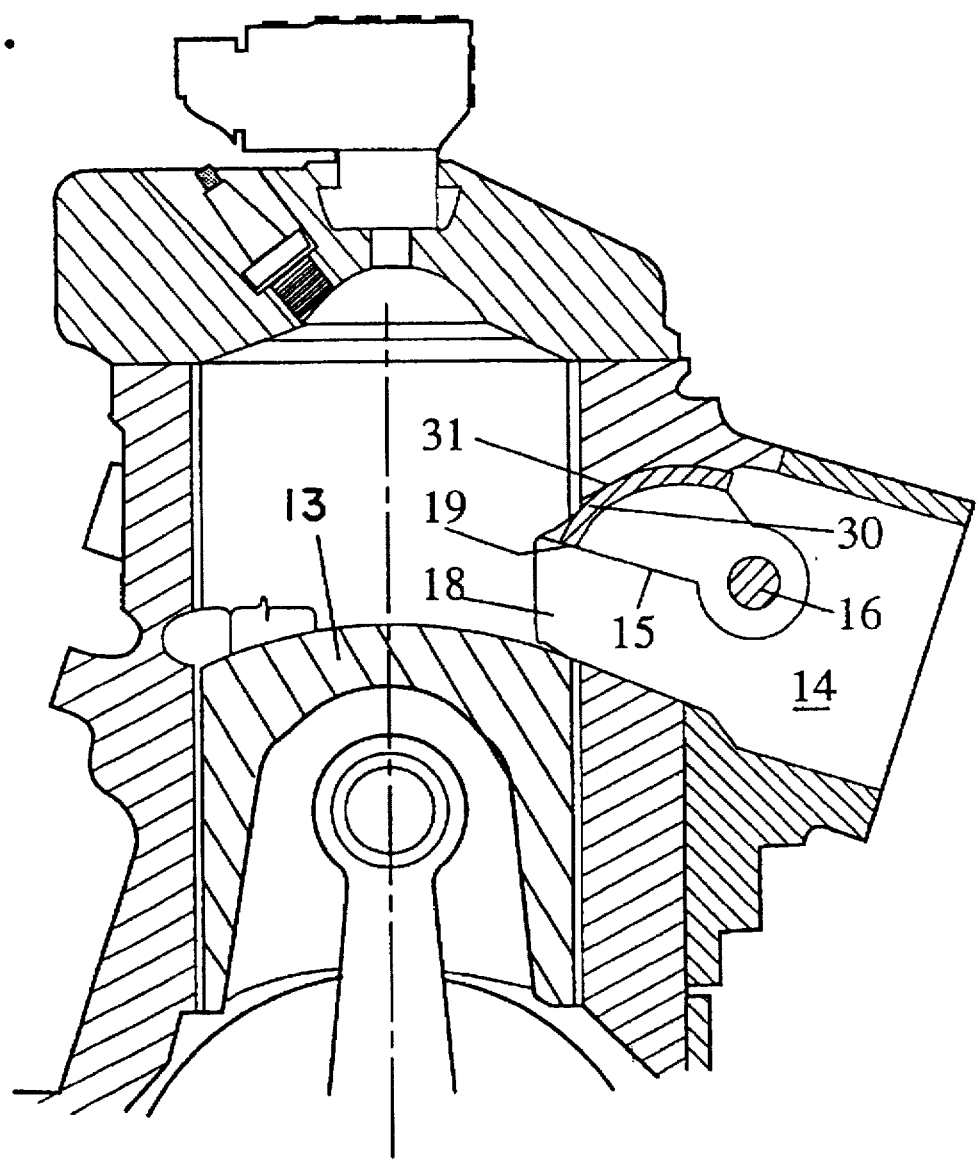

United States Patent

Worth et al.

[11] Patent Number: 5,709,177
[45] Date of Patent: Jan. 20, 1998

[54] EXHAUST VALVE TIMING CONTROL RESPONSIVE TO ENGINE IDLING AND SHUT-DOWN

[75] Inventors: David Richard Worth, Shento Park; Mark Douglas Archer, Subiaco; Brian Anthony Fitzgerald, Wembley, all of Australia

[73] Assignee: Orbital Engine Company, Balcatta, Australia

[21] Appl. No.: 549,764

[22] PCT Filed: Jun. 29, 1994

[86] PCT No.: PCT/AU94/00359

§ 371 Date: Nov. 30, 1995

§ 102(e) Date: Nov. 30, 1995

[87] PCT Pub. No.: WO95/01504

PCT Pub. Date: Jan. 12, 1995

[30] Foreign Application Priority Data

Jun. 30, 1993 [AU] Australia ................ PL9716

[51] Int. Cl.⁶ ................ F02D 9/04; F02D 9/08; F02D 13/02
[52] U.S. Cl. ................ 123/65 PE
[58] Field of Search ................ 123/65 PE, 65 P

[56] References Cited

U.S. PATENT DOCUMENTS

| | | | |
|---|---|---|---|
| 4,202,297 | 5/1980 | Oku et al. | 123/65 PE |
| 4,341,188 | 7/1982 | Nerstrom | 123/65 PE |
| 4,388,894 | 6/1983 | Tanaka et al. | 123/65 PE |
| 4,920,932 | 5/1990 | Schlunke | 123/65 PE |
| 5,410,993 | 5/1995 | Masuda et al. | 123/65 PE |
| 5,537,958 | 7/1996 | Nishimura | 123/65 PE |

FOREIGN PATENT DOCUMENTS

| | | |
|---|---|---|
| 210829 | 2/1987 | European Pat. Off. . |
| 246093 | 11/1987 | European Pat. Off. . |
| 2226596 | 7/1990 | United Kingdom . |
| 2234293 | 1/1991 | United Kingdom . |

OTHER PUBLICATIONS

Patent Abstract of Japan, M-911, p. 41, JP.A. 1-244125.
Patent Abstract of Japan, M-927, p. 63, JP.A.1-277628.
Patent Abstract of Japan, M-659, p. 80, JP.A.62-174515.

*Primary Examiner*—Marguerite McMahon
*Attorney, Agent, or Firm*—Nikaido, Marmelstein, Murray & Oram LLP

[57] ABSTRACT

A method of operating a two-stroke cycle internal combustion engine having at least one exhaust port communicating with each combustion chamber of the engine and an exhaust valve operably associated with at least one said exhaust port to control the timing of the opening and the flow area through said exhaust port between maximum and minimum values, the method comprising advancing the timing of the opening of the exhaust port in response to idle or low load operation to the maximum extent to maximize the flow area through the exhaust port. Other engine management operations disclosed and claimed include: positioning the exhause valve to reduce the flow area to the minimum extent on cessation of operation of the engine, and impacting the exhaust valve against the limits defining the maximum and minimum values of valve movement to promote dislodgement of carbon deposits.

16 Claims, 2 Drawing Sheets

EXHAUST VALVE TIMING CONTROL RESPONSIVE TO ENGINE IDLING AND SHUT-DOWN

This invention relates to the management of the operation of internal combustion engines, particularly two stroke cycle internal combustion engines having an exhaust valve associated with at least one of the exhaust ports of the combustion chambers of the engine.

It has been known to provide a valve in association with the exhaust port of each cylinder of a two stroke cycle engine for the purpose of varying the timing of the commencement of the exhausting of combustion gases from the engine cylinders. Such an exhaust valve can be operated to improve the engine operation over the normal range of speeds and loads. For example, in some applications, the exhaust valve can be operated to delay the timing of the opening of the exhaust port at low to medium engine loads and speeds in order to improve the stability of the operation of the engine, and at higher loads and speeds the timing of the opening of the exhaust port can be advanced so as to open earlier in the expansion stroke resulting in a higher torque output of the engine when coupled with an appropriately tuned exhaust system. When the exhaust valve is used solely for these purposes, it is commonly referred to as a "power valve", and such power valves have in the past been commonly used in two stroke cycle engines as installed in motorcycles.

More recently, it has been proposed in the applicant's U.S. Pat. No. 4920932 to provide an exhaust valve for the exhaust port of each cylinder of a multi-cylinder two stroke cycle engine, and by virtue of use of an electronic control unit (ECU), varying the relationship of the exhaust valve to the exhaust port for the purpose of controlling the combustion process in the respective cylinders of the engine to contribute to the control of contaminants in the exhaust gas released from the engine. In that proposal, the exhaust valve of each cylinder of the engine is coupled to a common control mechanism under the management of an ECU programmed to determine from the prevailing engine operating conditions the appropriate location for the exhaust valves with respect to the exhaust ports. This ability to control the position of the exhaust valve provides the scope for further improving the operation of two stroke cycle engines, and for the management of a range of problems which arise under particular operating conditions.

It has also been noted in regard to the operating of two stroke cycle engines that, while the engine is operating at a low fuelling rate, such as during or near idle operation at low load, the temperature of the combustion gases in the engine cylinders is relatively low. Hence the development of carbon build-up on the exposed surfaces in the combustion chamber, including surfaces of exhaust valves arranged in cylinder exhaust ports, is commonly experienced. Also, the low temperature of the exhaust gases in such circumstances can lead to a reduction in the temperature of a catalytic converter, which may be provided in the exhaust system, to below that necessary to maintain the catalyst operational, this temperature commonly being referred to as the "light-off" temperature.

It is therefore the object of the present invention to provide a method of using the exhaust valve provided at the exhaust port of an internal combustion engine to enhance the operation of the engine and/or control deterioration of the engine performance.

Accordingly, it is proposed by the present invention that there is provided, a method of operating an internal combustion engine having at least one combustion chamber having an exhaust port and a cooperating exhaust valve and means operable to vary the timing of the commencement of the opening of the exhaust port between preset limits, the method comprising advancing the timing of the opening of the exhaust port to the earliest timing within said limits in response to the engine operating at idle or low load conditions.

More specifically, there is provided a method of operating a two stroke cycle internal combustion engine having at least one exhaust port communicating with each combustion chamber the engine, and an exhaust valve operably associated with at least one of said exhaust ports and means operable to control the timing of the opening of said exhaust port, said exhaust valve and exhaust port being adapted whereby the flow area through the port increases in response to advance of the timing of the opening of the exhaust port within preset limits, said method comprising advancing the timing of the opening of the exhaust port to the earliest opening time within said limits in response to the engine operating at or near idle conditions.

As is known to those skilled in the art, controlling of the timing of the opening of the exhaust port directly affects the flow area through said exhaust port. Hence, advancing the timing of the opening of the exhaust port to the earliest timing available results in the provision of a maximum flow area through the exhaust port when fully open.

Conveniently, in response to the engine speed dropping to idle, near idle speed, or to low load operation, a control mechanism is activated to move the exhaust valve to a location where the timing of opening of the exhaust port is advanced to, and hence the flow area through the exhaust port will substantially be, the maximum achievable within the extent of movement of the exhaust valve. Alternatively, provision may be made for the exhaust valve to be located to enable, when the engine is operating at or near idle speed or low load, movement thereof which is beyond the location which provides the maximum advance for timing of the opening of the exhaust port.

The positioning of the exhaust valve so that there is provided a maximum advance for the timing of opening Of the exhaust port, and hence a maximum flow area through the exhaust port, results in the combustion gas being retained in the combustion chamber for a minimum period after combustion is initiated, and being at a generally higher temperature at the commencement of exhaust than would normally be the case. Consequently, the likelihood of the development of carbon build-up on the surfaces of the combustion chamber and the exhaust valve is substantially reduced as a consequence of the higher temperature of the combustion gas being sufficient to combust materials likely to create deposits, and the shorter time period during which the combustion chamber and the exhaust valve are exposed to such materials.

Also, when the exhaust valve is in the position to provide a maximum advance for the timing of opening of the exhaust port, and hence a maximum flow path through the exhaust port, a minimum area of the surfaces of the exhaust valves are exposed to the combustion gases, thereby reducing the risk of carbon build up on the exhaust valve that could lead to defective operation such as sticking thereof. Further, as the exhaust gas is at a higher temperature when released from the combustion chamber, due to an effective reduction in the expansion stroke of the cylinder cycle, there is a reduced likelihood of any catalytic converter in the exhaust system falling to a temperature below the necessary light-off temperature thereof.

It will be appreciated that with the exhaust valve being in the position to provide the maximum advance for the timing of opening and hence the maximum flow path and resulting in the reduction of the effective expansion stroke, and the exhaust gas being at a higher temperature when exhausted, the thermal efficiency of the engine is reduced and consequently, some increase in the fuelling rate may be required to maintain stability of the engine operation. However, there is a corresponding benefit in that more fuel also results in more heat being available to the exhaust system to maintain the catalytic converter above the light-off temperature. Also, it is a characteristic of two stroke cycle stratified charge engines that the level of hydrocarbons in the exhaust emissions when the engine is at idle and low load can be reduced by a limited degree of increase in fuelling rate.

In the light of these considerations, it may be preferred to only move the exhaust valve to provide the maximum advance for the timing of opening and hence the maximum flow area after the engine has been operating in the idle condition or at low load for a predetermined time interval. Thus, for example, the control mechanism could be programmed so that the exhaust valve is only moved to the position to provide the maximum advance for the timing of the opening and hence the maximum flow area position after, say, idle operation has been experienced for a period of say about 20 seconds or another appropriate time normally not greater than 30 seconds. Alternatively, or in conjunction therewith, the above strategy discussed with respect to idle operation of the engine may be implemented in response to the existence of a selected engine coolant medium temperature such as for example, above 60° C. and preferably 70° C., or an exhaust catalytic converter temperature, or any combination of these and/or other characteristics of engine operation.

The control of the exhaust valve associated with the exhaust port of a two stroke internal combustion engine as described herein is proposed to be under the control of a programmed electronic control unit (ECU). It will be appreciated that it is necessary for the ECU to be able to determine where the exhaust valve is in relation to the respective limits of travel thereof at all times during the engine operation, as that position will be relevant to the degree and direction of movement which is to be applied to the exhaust valve to achieve the desired influence on the engine operation.

There is thus provided for a two stroke cycle internal combustion engine having at least one exhaust port communicating with each combustion chamber of the engine and an exhaust valve operably associated with at least one exhaust port, said exhaust valve being movable within respective physical limits representing the maximum advance and retard positions of the exhaust valve, a method of controlling the movement of the exhaust valve whereby the extent of travel of the exhaust valve is less than the distance between said physical limits so that under normal operation the valve will not engage the respective physical limits.

The limiting of the actual travel of the exhaust valve to an amount less than the full distance between the physical limits is a safeguard against overloading of the driving mechanism that effects the movement of the exhaust valve, the overloading potentially arising if the physical stops were required to constantly limit the movement of the exhaust valve in the respective directions.

However, it may be appropriate at certain times to selectively bump the drive mechanism such as against the physical stops as a technique to dislodge carbon or other deposits on the exhaust valves and/or the physical limits.

Further, the electronic control device managing the movement of the exhaust valve can be programmed to periodically check the physical limits which ultimately constrain the movement of the exhaust valve in either direction. If it is found that the physical limits differ from the pre-programmed settings, adjustment can be made to re-establish the "soft" limits of the exhaust valve travel as set by the ECU so that these limits are less than and spaced from the physical limits. That is, the tolerance between the soft limits and the physical limits is re-evaluated and re-defined by the ECU. The departure of the spacing between the physical limits and the soft limits from the prescribed spacing may be due to the build-up of deposits on the surfaces of the exhaust valve and/or the physical limits of movement thereof. This procedure can conveniently be carried out after the procedure to bump free deposits on the exhaust valves. Both the bumping of the drive mechanism and the resetting of the physical and soft limits of travel can conveniently be effected each time the engine is shut down or after a preselected number of engine shut downs.

It may also be desirable to provide for the positioning of the exhaust valve to provide a reduced heat flow into the cylinder from the exhaust system, the exhaust valve preferably being moved to provide a reduced flow area in response to cessation of operation of the engine.

Conveniently, in response to cessation of the operation of the engine, a control mechanism is actuated to move the exhaust valve to a location where the flow area through the exhaust port will be the minimum achievable within the extent of movement of the exhaust valve. The exhaust valve may be arranged to move to the position of minimum flow area of the exhaust port normally available during operation of the engine, or alternatively, provision may be made for the exhaust valve to be located to provide a flow area less than the minimum available during normal engine operation, when the engine operation has ceased.

The reducing of the flow area through the exhaust port at the cessation of operation of the engine enables the exhaust valve to function as a heat shield to the corresponding cylinder and reduces the rate of heat transfer from the exhaust system back into the cylinder, thereby reducing the heat energy available to give rise to the formation of gum and carbon deposits within the cylinder and combustion chamber. Such deposits may arise from the oil film left on the cylinder and combustion chamber walls being subject to the high temperature conditions generated in the cylinder and combustion chamber from the heat transferred thereinto from the exhaust system. Such deposits can adversely affect the subsequent operation of the engine when next started up.

In particular, this restriction of heat flow into the cylinder is particularly desirable where catalytic converters are provided in the exhaust system, as such catalytic converters operate at a high temperature and are commonly located only a relatively short distance downstream from the exhaust port. Thus, on cessation of engine operation, such catalytic converters will typically be quite hot and heat may be radiated and conducted from the catalytic converter back into the engine cylinder through the exhaust port. Thus, reducing the flow area through the exhaust port will significantly reduce the heat transfer from the catalytic converter to the cylinder and hence reduce the development of undesirable deposits within the cylinder and corresponding combustion chamber.

It is also recognised that difficulty may be experienced in restarting an engine where the exhaust valve has become unmovable in a position where the flow area through the exhaust port is unduly restricted. For example, if the exhaust valve were left in a position where the exhaust flow is restricted upon cessation of the engine operation, and at the desired time of a subsequent start-up, the vehicle battery was only holding a low voltage such as may be the case if the vehicle has remained in harsh, cold conditions for some time, there may in fact be insufficient voltage to actuate the exhaust valve and hence move it to a necessary position which would enable starting. Hence, the exhaust valve would remain at its closed position as set upon engine cessation and the engine may be difficult to re-start.

Accordingly, it may be desirable that the control strategy for reducing the flow area of the exhaust port to a minimum upon cessation of the engine operation allows for this minimum flow area to correspond to an exhaust valve position where the flow area through the exhaust port is such as to not hinder re-starting of the engine.

Further, the control strategy may be arranged to return the exhaust valve to a preferred start-up position after the exhaust port flow area has been restricted to a minimum value for a preselected interval of time from engine shut-down. Also, it is to be understood that the control of the exhaust valve after cessation of the engine operation, so that it will be in a position to enable ready restarting of the engine, may be carried out as a function independent of the initial closing of the exhaust valve to provide a minimum flow area through the exhaust port. In particular, this period of closing the exhaust valve to provide the minimum flow area may not be necessary where the catalytic converter in the exhaust system is located a substantial distance downstream from the exhaust port. This procedure can be conveniently carried out after the procedure to re-establish the limits of the exhaust valve as described hereinbefore.

A typical construction of the exhaust valve and the mechanism for actuation thereof is illustrated in the accompanying drawings.

IN THE DRAWINGS

Figure 2:
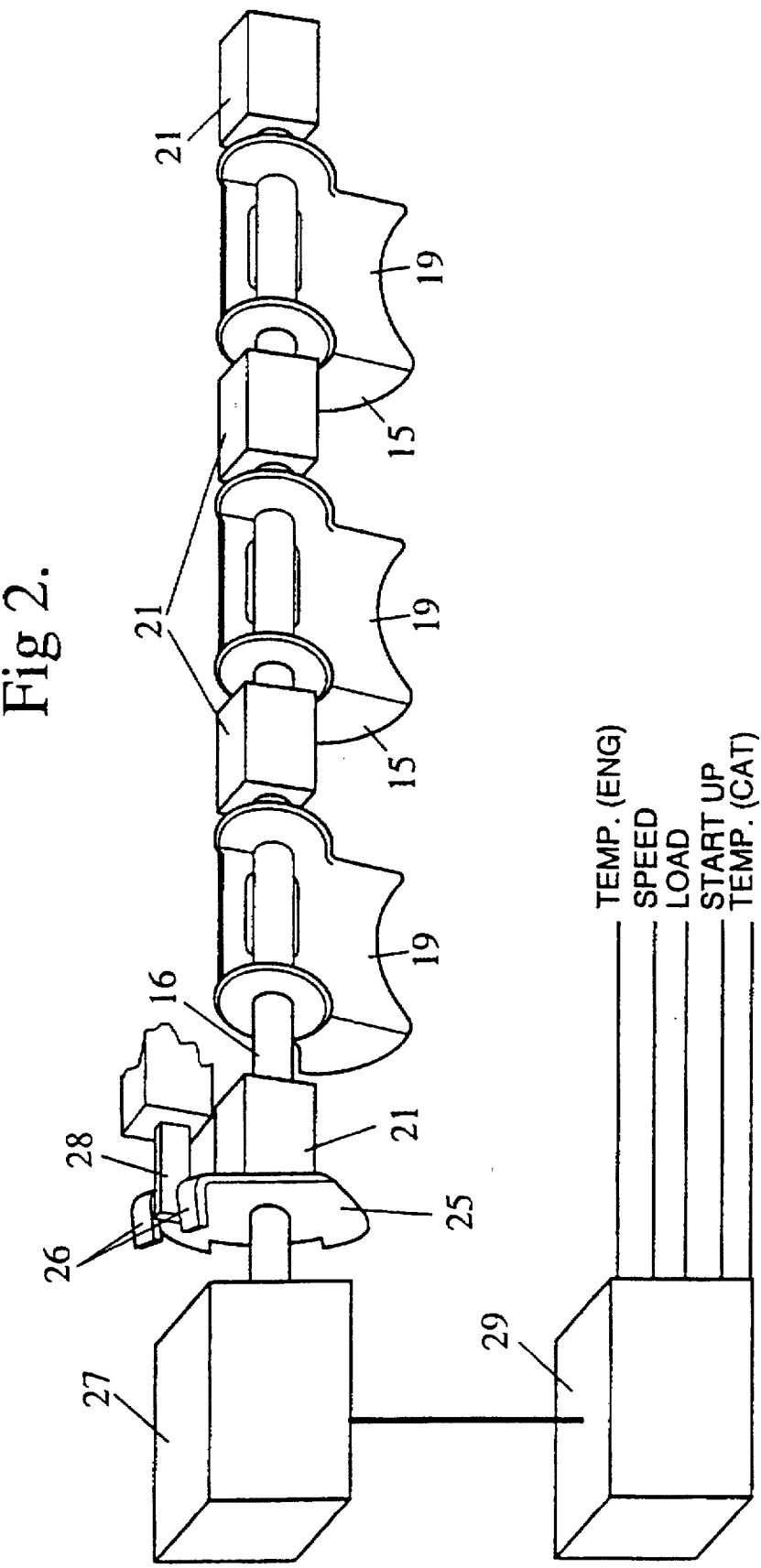

FIG. 1 is a sectional view of a two stroke cycle engine incorporating an exhaust valve operatively mounted in an exhaust port; and FIG. 2 is a perspective view of an assembly of three exhaust valves mounted on a common shaft for use in a three cylinder two stroke cycle engine.

Referring now to FIG. 1 of the drawings, the exhaust valve 15 is located within the exhaust passage 14 and mounted on the shaft 16 to angularly move about the axis of the shaft 16 extending transverse to the exhaust port 18 and co-operating with the exhaust port 18 in a generally known manner. The exhaust valve 15 does not typically completely close the port 18 at any stage in the operation of the engine, but generally serves to alter the effective position of the upper edge of the exhaust port 18 thereby altering the position in the stroke of the piston 13 that the exhaust port 18 commences to open. The exhaust valve 15 typically does not alter its position in a cyclic manner during each combustion cycle, but is controlled to change its position in response to engine operating conditions. Such exhaust valves and the operation thereof are known to those skilled in the design of modern two stroke engines. The exhaust valve 15 is shown in FIG. 1 in the position where it is raised to its full extent to give the earliest exhaust port opening time and the maximum exhaust port open period and hence the maximum exhaust port flow area.

In a multi-cylinder engine, the exhaust valve 15 of each cylinder may be mounted on a common shaft 16 as shown in FIG. 2 so that all of the exhaust valves 15 move in unison to vary the position of the control edge 19 of each exhaust valve 15 simultaneously, and so that they each occupy the same position in the respective exhaust ports 18 at the same time. The shaft 16 is supported by bearings 21 at each end of the shaft 16 and also intermediate each two adjacent exhaust valves 15. The bearings 21 are suitably mounted or formed integral with the engine block, an example of which is disclosed in the applicant's co-pending Australian Patent Application No. 22417/92.

The coupling 25 is mounted on an end of the shaft 16 for drive coupling to a suitable motor 27. The motor 27 is operable to rotate the shaft 16 in either direction to adjust the position of the control edge 19 of the exhaust valves 15 with respect to the exhaust ports 18. Physical stops 26 provided on the coupling 25 co-operate with the fixed pin 28 to limit the extent of movement of the exhaust valves 15 in each direction with respect to the exhaust ports 18. The pin 28 is fixably anchored to or formed as part of the cylinder block or exhaust system at a location selected to provide the desired limits to the movement of the exhaust valves 15.

The operation of the motor 27 is typically controlled by an electronic control unit (ECU) 29 programmed to receive appropriate input signals indicating the state of a range of engine operating conditions, and to determine therefrom the position in which the exhaust valves 15 should be located with respect to the exhaust ports 18, and to control movement of the exhaust valves 15 to occupy that position. The fundamental engine conditions that will typically be included as inputs to the ECU 29 are engine speed, engine load, and engine operating temperature. Other inputs may include catalyst temperature, time or revolutions from engine start-up, and/or signals indicating engine shut-down.

Suitable programmes can be stored in the ECU 29 to perform each and/or all of the functions and operations of the exhaust valve 15 as herein referred to and disclosed. Such programming can be readily carried out by people of normal skill in the programming of ECU's to be employed in the management of the operation of internal combustion engines.

In particular, in respect to the operation of the exhaust valves 15 to provide a maximum advance of the timing of the opening of the exhaust port and hence a maximum exhaust port 18 flow area when the engine is operating at or near idle or low load, the ECU 29 is programmed to firstly determine if the engine is operating at or near idle, which can be determined from both the engine speed and load being low, that is, within specific limits, at the same time. However, if the engine is idling and the engine coolant temperature is low, say below about 70° C., this indicates a cold start condition whereupon the exhaust port 18 should preferably not be opened to the maximum flow position. Other engine operating conditions and stability requirements typically require the engine coolant to warm up to a temperature of about 60° to 70° C. before any such opening of the exhaust valves 15 is performed. Accordingly, the ECU 29 will open the exhaust valves 15 to the most advanced position to enable maximum flow areas at the exhaust ports 18 when the engine is up to operating temperature, or at least close thereto, as indicated by the coolant temperature, and the engine is at or near idle or low load operation. Idle speed and low load can typically be determined from engine load and speed inputs. The ECU 29 can determine if the engine load is such as is indicative of engine idle or low load from the fuelling rate, the throttle position or the accelerator pedal position, or any combination thereof.

When the ECU 29 has determined that the engine is at idle or low load and is up to operating temperature, it will activate the motor 27 to rotate the shaft 16 in a direction to locate the exhaust valves 15 in the position where the maximum flow area of each exhaust port 18 is available for discharge of exhaust gas from the engine cylinders into the corresponding exhaust passages 14. Normally, the ECU 29 will maintain the exhaust valves 15 in that position until the engine moves out of the idle or low load condition. Once the engine has moved out of the idle or low load condition, the ECU 29 will exercise the normal engine management programmes in the known manner.

As previously referred to, it is desirable at cessation of the operation of the engine to position the exhaust valves 15 to restrict radiation and conduction of heat from the exhaust system back into the combustion chambers of the engine. Thus, the ECU 29 is also programmed to activate the motor 27 when the engine ceases operation to rotate the shaft 16 to position the exhaust valves 15 to close the exhaust ports 18 or to provide a minimum flow path therethrough. The ECU 29 will detect engine shut down from the input of the engine speed sensor indicating zero speed of revolution and/or the engine ignition switch being moved to the "off" position.

As for subsequent start-up of the engine, it may be desirable for the exhaust valves 15 to be positioned to provide a relatively restricted flow area through the exhaust ports 18 which is also sufficient to enable re-starting of the engine should the exhaust valves 15 become unmovable. A flow area of approximately 18 to 25 percent of the maximum flow area may be suitable in this regard. Accordingly, the ECU 29 is programmed to activate the motor 27 to move the exhaust valves 15 to a position to provide such a restricted flow area at a time interval after shut down when the temperature in the exhaust system has dropped to a selected value. Alternatively, the exhaust valves 15 may be moved to a predetermined position which provides the desired restrictive percentage flow area immediately upon cessation of engine operation, this position of the exhaust valves 15 still providing some benefit in reducing the amount of heat radiated back into the cylinders by the exhaust system.

There has previously been reference to providing for limits of the extent of movement of the exhaust valve 15 that are more restrictive than the physical stops 26 of the coupling 25. These more restrictive stops, as alluded to hereinbefore, can be referred to as "soft stops". These soft stops are derived by programming the ECU 29 to normally only operate the motor 27 to rotate the shaft 16 to a specific maximum extent in either direction from a fixed datum. In normal operation, the extent of movement of the exhaust valves 15 will be limited by the soft stops and not by the physical stops constituted by the stops 26 acting on the pin 28.

This arrangement of soft stops can be employed in the control of the exhaust valve movement so that the motor 27, the physical stops 26 and the pin 28 are not subjected to the impact loads arising from the use of physical stops to limit the rotation of the shaft 16 that actuates the exhaust valves 15. However, the ECU 29 can be programmed to periodically operate the motor 27 to overrun the soft stops so each of the physical stops 26 individually engage the fixed stop pin 28 to create a physical blow on the respective stops 26 to generate a "jarring" or "jolting" action on the shaft 16 and hence the exhaust valves 15. Such action may dislodge deposits that may have built-up on the exhaust valves 15. Further, the pin 28 may be removed from its fixed location such that the exhaust valves 15 are able to be controllably driven or actuated such that they physically contact the upper and lower surfaces of the respective exhaust passage 14. This too would serve to dislodge deposits therefrom as each exhaust valve 15 would directly receive a jar or jolt from a physical impact. Still further, the exhaust valves 15 may be arranged in such a way within the respective exhaust passages 14 that any overrun of the programmed soft stops may result in "scraping" of deposits from the surface of each exhaust valve 15 as it was being "swept" over a close, corresponding upper or lower surface of the respective exhaust passage 14. This is evident from FIG. 1 of the drawings showing the front surface 30 of the exhaust valve 15 in very close proximity to an upper surface 31 of the exhaust passage 14.

The ECU 29 can be programmed to carry out such a cleaning procedure at a regular time interval or at the occurrence of a particular event in the operation of the engine such as each engine shut-down or after a set number of engine shut-downs. Also, if during a cleaning procedure some build-up on the exhaust valve 15 cannot be dislodged, and is of an extent that effects the correct location of a soft stop, the ECU 29 can be programmed so as to reset the soft stop such that the movement of the exhaust valve 15 compensates for the build-up thereon.

Aspects of the present invention have been described primarily with respect to two-stroke engines, however, it should be appreciated that aspects of the invention are also applicable for four-stroke engines.

We claim:

1. A method of operating an internal combustion engine having at least one combustion chamber having an exhaust port and a cooperating exhaust valve and means operable to vary the timing of the commencement of the opening of the exhaust port between preset limits, the method comprising advancing the timing of the opening of the exhaust port to the earliest timing within said limits, in response to the engine operating at idle or at low load and low engine speed conditions.

2. A method as claimed in claim 1, wherein said advancing of the timing of the opening of the exhaust port is delayed a predetermined time interval from initial establishment of said idle or low load conditions.

3. A method as claimed in claim 1 or 2 wherein said advancing of the timing of the exhaust port opening is only effected when the engine is operating at a temperature above 60° C.

4. A method of operating a two stroke cycle internal combustion engine having at east one exhaust port communicating with each combustion chamber, and an exhaust valve operably associated with at least one said exhaust port and means operable to control the timing of the opening of said exhaust port, said exhaust valve and exhaust port being adapted whereby the flow area through the exhaust port increases in response to advance of the timing of the opening of the exhaust port within preset limits, said method comprising advancing the timing of the opening of the exhaust port to the earliest opening time within said limits in response to the engine operating at or near idle conditions.

5. A method as claimed in claim 4 wherein said advancing of the timing of the opening of the exhaust port is delayed a predetermined time interval from initial establishment of said idle or near idle conditions.

6. A method as claimed in claim 4 wherein said advancing of the timing of the exhaust port opening is only effected when the engine is operating at a temperature above 60° C.

7. A method as claimed in any one of claims 4 to 6 wherein said idle or near idle condition is determined by the engine load being below a predetermined valve.

8. A method as claimed in any one of claims 4 to 6 wherein said idle or near idle condition is determined by the engine speed and engine load being below respective selected values.

9. A method as claimed in any one of claims 4 to 6 wherein in response to cessation of operation of the engine, the exhaust valve is located in a position to provide the minimum flow area through the exhaust port.

10. A method as claimed in claim 9 wherein the exhaust valve is moved after being in said minimum position for a preselected time interval to a selected engine start-up position that provides a flow area greater than said minimum flow area.

11. A method as claimed in any one of claims 4 to 6 wherein in response to cessation of operation of the engine, the exhaust valve is moved to a selected engine start-up position that provides a flow area less than that which results when the timing of the opening of the exhaust port is advanced to the earliest opening time.

12. A method as claimed in any one of claims 4 to 6 wherein the position of the exhaust valve is controlled by a programmable electronic controller, said electronic controller being programmed to set respectively the maximum and minimum extent of advance of the opening of the exhaust port.

13. A method as claimed in claim 12 when applied to an engine provided with respective physical limits to define the maximum extent of movement of the exhaust valve in each direction, the maximum and minimum extent of advance being set within said physical limits so that under normal operation the exhaust valve will not engage the respective physical limits, said method including the steps of impacting the exhaust valve against at least one of the respective physical limits at time intervals determined by said electronic controller to promote dislodgement of deposits.

14. A method as claimed in claim 12 when applied to an engine provided with actuator means to effect movement of the exhaust valve in each direction, and respective physical limits to interact with said actuator means to define the maximum extent of movement of the exhaust valve in each direction, the maximum and minimum extent of advance being set within said physical limits so that under normal operation the actuator means will not engage the physical limits, respective said method including the steps of impacting the actuator means against at least one of the physical limits at time intervals determined by said electronic controller to promote dislodgement of deposits.

15. A method as claimed in claim 1 or claim 4 wherein when the engine is operating at or near idle or low load and the exhaust valve is advanced to the earliest opening position, the fuelling rate to the engine is increased.

16. A method of operating an internal combustion engine having at least one exhaust port communicating with each combustion chamber of the engine and an exhaust valve operably associated with said at least one said exhaust port to control the flow area through said exhaust port between maximum and minimum values, the method including locating the exhaust valve in a position to provide a minimum flow area through the exhaust port in response to shut-down of the engine.

* * * * *